UNITED STATES PATENT OFFICE.

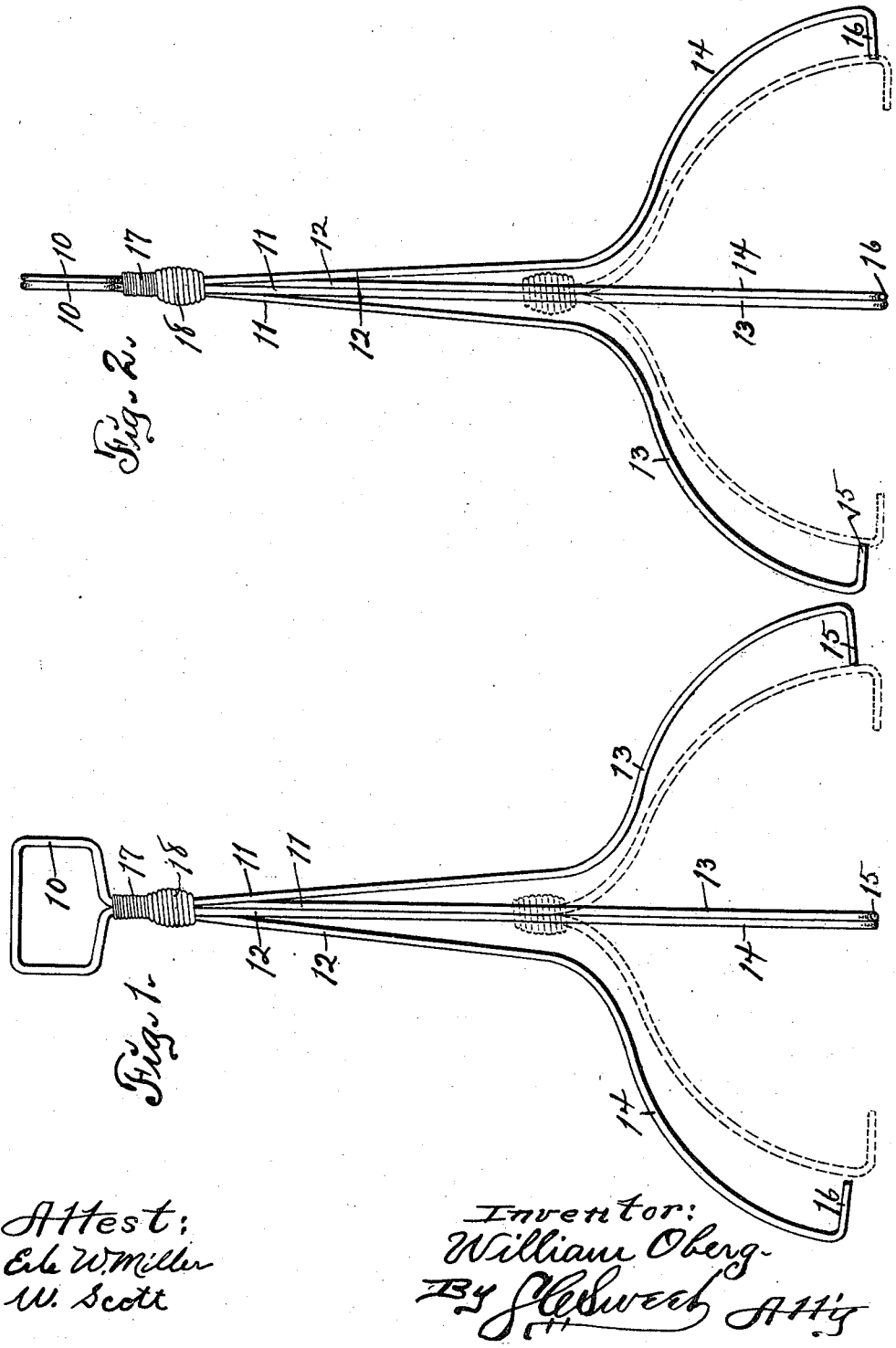

WILLIAM OBERG, OF OAKLAND, NEBRASKA, ASSIGNOR OF ONE-HALF TO EPHROM LINDAHL, OF OAKLAND, NEBRASKA.

LIFTING-TOOL FOR COMMODES AND CUSPIDORS.

976,282.  Specification of Letters Patent. Patented Nov. 22, 1910.

Application filed February 8, 1910. Serial No. 543,204.

*To all whom it may concern:*

Be it known that I, WILLIAM OBERG, a citizen of the United States of America, and a resident of Oakland, Burt county, Nebraska, have invented a new and useful Lifting-Tool for Commodes and Cuspidors, of which the following is a specification.

The object of this invention is to provide improved means for lifting and carrying cuspidors, commodes, jars and the like.

My invention consists in the construction, arrangement and combination of elements hereinafter set forth, pointed out in my claim, and illustrated by the accompanying drawing, in which—

Figure 1 is a side elevation of the complete device. Fig. 2 is an elevation at right angles to Fig. 1. In Figs. 1 and 2 the dotted lines indicate closed or gripping positions of the parts.

In the construction of the device as shown two yokes are employed and said yokes are of identical construction, and arranged opposite to each other. Each yoke is formed of a single length of steel wire or rod and is constructed as follows: Each yoke is formed with a rectangular handle portion 10 at its center; integral stems 11, 12 extending in slightly diverged planes from the center of one side of the handle portion; flaring arms 13, 14 integral with the stems, and fingers 15, 16 integral with and extending inward from extremities of the flaring arms. The yokes are arranged on their stems in contiguity with each other and are confined in such positions by a bond 17 of wire wrapped around said stem portions adjacent to the handle portions. A collar 18 is slidingly mounted and embraces the stem portions of handle yokes. This collar preferably is made of coiled wire, and is approximately barrel shaped in elevation so that the end portions thereof slidingly engage the stems of the yokes while the central portion thereof is bulged or bellied outward from said stems.

The construction of the device is such that the flaring arms may extend outside of and the fingers extend beneath any flange or boss of a vessel, such as a cuspidor, commode and the like, and then the collar 18 may be moved manually from its normal position into the position shown by dotted lines. When moved into the dotted position the collar 18 contracts the stems of the yokes toward each other, thus moving the flaring arms and fingers inward and causing said fingers to engage beneath a flange of the vessel. The flaring arms may be adjusted by manual bending at their points of juncture with the stems so as to fit them for embracing all vessels of various sizes. The fingers may be detached by resilient expansion of the arms and stems when the collar 18 is manually moved to its initial position.

I claim as my invention—

In a device of the class described, engaging members, stem members normally diverging from each other, handle members on said stem members, a bond rigidly connecting the stem members adjacent to the handle members, and a collar slidingly mounted on the stem members, said collar constructed of a wire coil engaging the stem members at its ends and laterally expanded from said stem members intermediate of its ends.

Signed by me at Oakland, Nebraska, this 23rd day of September, 1909.

WILLIAM OBERG.

Witnesses:
 C. C. NEUMANN,
 K. A. R. ANDERSON.